United States Patent [19]

Sahara

[11] 4,207,372
[45] Jun. 10, 1980

[54] DESTRUCTIBLE FILMS FOR MARKING, PROCESS FOR THEIR PRODUCTION, AND THEIR UTILIZATION

[75] Inventor: Masao Sahara, Uozu, Japan

[73] Assignee: Nippon Carbide Kogyo Kabushiki Kaisha, Tokyo, Japan

[21] Appl. No.: 915,300

[22] Filed: Jun. 13, 1978

[30] Foreign Application Priority Data

Jun. 14, 1977 [JP] Japan .................................. 52-69494

[51] Int. Cl.$^2$ ...................... C08L 27/06; C08L 75/04; C09D 5/08; C09J 7/00
[52] U.S. Cl. .................................. 428/220; 260/42.21; 260/42.49; 525/125
[58] Field of Search ........... 260/42.21, 42.49, 859 PV; 428/220; 525/125

[56] References Cited

U.S. PATENT DOCUMENTS

| | | | |
|---|---|---|---|
| 2,872,430 | 2/1959 | Parker et al. | 260/859 PV |
| 3,024,216 | 3/1962 | Smitmans et al. | 260/859 PV X |
| 3,381,056 | 4/1968 | Beer | 260/859 PV |
| 3,879,239 | 4/1975 | Roger et al. | 260/42.49 X |

Primary Examiner—Sandra M. Person
Attorney, Agent, or Firm—Wenderoth, Lind & Ponack

[57] ABSTRACT

A destructible marking film having a thickness of about 30 to about 100 microns and a destructibility of not more than 150 kg.cm/mm, said film being composed of a resin composition comprising (A) 100 parts by weight of a vinyl chloride resin having a degree of polymerization of about 600 to about 1,600 and optionally containing not more than about 15% by weight of a comonomer unit,
(B) about 10 to about 100 parts by weight of a thermoplastic urethane resin,
(C) about 2 to about 15 parts by weight of an ethylene/vinyl ester copolymer, and
(D) about 10 to about 150 parts by weight of a pigment;

a process for preparing the marking film; and a method for marking by applying the same to the surface of a substrate.

9 Claims, No Drawings

DESTRUCTIBLE FILMS FOR MARKING, PROCESS FOR THEIR PRODUCTION, AND THEIR UTILIZATION

This invention relates to destructible films which are useful for a wide range of marking purposes, for example as certifying seals, sealing and other labels, decorative or display stickers for motor vehicles and containers, advertisement display stickers used to mark figures and letters on signboards, and various display stickers such as traffic markings, road markings, guide boards, danger warning markings and markings on commodities on the market.

For use in the aforesaid applications, marking films are required to have suitable destructibility whereby breakage which occurs partly in the films does not extend to the surrounding part. In addition, they desirably should possess good workability during adhesion to a substrate, thermal stability, ease of manufacturing operation, low costs, environmental safety during manufacture, productivity, surface smoothness, and reproducibility of quality. The present invention relates to destructible marking films having superior destructibility, thermal stability, surface smoothness and productivity, and improved resistance to deterioration by heat after adhesion, dimensional stability and weatherability; and to a process for their production, and to their utilization.

More specifically, the present invention relates to a destructible marking film having a thickness of about 30 to about 100 microns and a destructibility of not more than 150 kg.cm/mm, said film being composed of a composition consisting essentially of (A) 100 parts by weight of a vinyl chloride resin having a degree of polymerization of about 600 to about 1,600 and optionally containing not more than about 15% by weight of a comonomer unit, (B) about 10 to about 100 parts by weight of a thermoplastic urethane resin, (C) about 2 to about 15 parts by weight of an ethylene/vinyl ester copolymer, and (D) about 10 to about 15 parts by weight of a pigment.

Destructible films for marking have heretofore been produced solely by a casting method (coating method). This is firstly because conventional destructible marking films are ultrathin films with a thickness of less than about 70 microns, usually up to about 30 microns. If it is desired to form such a thin and substantially unstretched film by a melt-extrusion method, there is no choice but to adopt an extremely slow extruding speed. As a result, there is considerable occurrence of thickness unevenness. Furthermore, the film naturally undergoes heat decomposition for a long period of time, and its deterioration cannot be avoided. Such a method is never commercially feasible.

Secondly, when it is desired to form such an ultrathin and substantially unstretched film by a calender method, the separating force of the roll clearance increases. Hence, it is necessary to increase the roll pressure markedly, and an extreme decrease in the speed of production cannot be avoided. It is actually impossible to obtain an ultrathin film having substantially no directionality and a uniform thickness by this method.

Accordingly, if it is desired to obtain an ultrathin film by the melt-extruding or calendering method, it is necessary to render the resulting film thinner by a stretching means. The resulting films are not acceptable as destructible marking films.

It was suggested in the past to blend 30 to 70% by weight of an ethylene/vinyl acetate copolymer with a vinyl chloride resin so as to provide a molding material based on the vinyl chloride resin and having improved mechanical properties, especially impact strength (German Pat. No. 1,544,803). As will be shown hereinbelow in Comparative Examples 3 and 4, such a blend does not show favorable characteristics as destructible marking films. This patent shows an example of blending a thermoplastic urethane resin with a vinyl chloride resin for comparative purposes. This blend also fails to show properties useful for destructible marking films, as will be shown hereinbelow in Comparative Examples 1 and 2.

In an attempt to remove the aforesaid manufacturing restrictions, and to provide a destructible marking film of superior quality, the present inventors previously suggested a destructible marking film, which is an ultrathin calender film having a thickness of about 30 to about 60 microns and composed of 100 parts by weight of a vinyl chloride resin having a degree of polymerization of about 600 to about 2,000, about 5 to about 20 parts by weight of an alkyl methacrylate resin and about 5 to about 30 parts by weight of a liquid plasticizer (Japanese Laid-Open Patent Publication No. 128943/77).

On further investigation, the inventors of the present application found that the destructible film having the improved properties in the above patent, presumably because of the inclusion of a liquid plasticizer, should desirably be further improved in dimensional stability and resistance to heat deterioration after adhesion. The inventors therefore continued to work on this subject in an attempt to provide a destructible marking film which achieves the desired improvements and has superior destructibility, thermal stability, surface smoothness and weatherability and is free from the foregoing manufacturing restrictions.

These investigations led to the discovery that a film having a thickness of about 30 microns to about 100 microns and comprising (A) 100 parts by weight of a vinyl chloride resin having a degree of polymerization of about 600 to about 1,600 and optionally containing not more than about 15% by weight of a comonomer unit, (B) about 10 to about 100 parts by weight of a thermoplastic urethane resin and (C) about 2 to about 15 parts by weight of an ethylene/vinyl ester copolymer, with the omission of an alkyl methacrylate resin used as an essential ingredient in the aforesaid proposal, can be used as a destructible marking film having superior destructibility, thermal stability, surface smoothness, dimensional stability and resistance to heat deterioration after adhesion. It has also been found that the aforesaid manufacturing restrictions can be removed, and the film can be formed not only by calendering but also by extrusion.

The need to use a liquid plasticizer in the conventional destructible marking films can be obviated in the present invention. When an adhesive is applied to one surface of a destructible marking film, for example when it is stored as adhered to a strippable base film, the liquid plasticizer migrates to the adhesive layer to reduce the adhesion strength of the adhesive. Furthermore, there are many restrictions on the selection of the type of adhesive so as to prevent a reduction in the performance of the destructible marking film itself, and therefore, its outdoor adhesion in the wintertime is difficult. These disadvantages have been found to be conveniently overcome by the present invention. In addition, the omission of a liquid plasticizer in the present invention can lead to the prevention of the peeling of the destructible film from the adhesive layer which is caused by the migration and accumulation of the plasticizer to and in the interface between the destructible film and the adhesive layer at high temperatures in the summertime.

Provision of an undercoat or lamination of another film so as to inhibit the migration of the liquid plasticizer is disadvantageous because they add to the number of process steps and to the cost of production. Moreover, the solvent in the undercoating solution or the solvent in the adhesive used for laminating is likely to deteriorate the properties of the destructible film.

Furthermore, the amount of the plasticizer cannot be reduced to such an extent as can eliminate the defects associated with the migration of the plasticizer. The use of a polymeric liquid plasticizer causes a deterioration in the suppleness of the destructible film and in the operation of adhering the film to a curved surface of a substrate, and adversely affects the destructibility of the film.

It has been found that according to this invention, these difficulties can be conveniently overcome by the cooperative action of the vinyl chloride resin, the thermoplastic urethane resin and the ethylene/vinyl ester copolymer described above.

As is well known, the thermoplastic urethane resin has unsatisfactory weatherability and the urethane resin and the ethylene/vinyl ester copolymer both have unsatisfactory moldability. In view of this, it is quite unexpected that the cooperative action of the three resins employed in the present invention can afford, with good productivity, a destructible marking film having better destructibility, thermal stability, surface smoothness, dimensional stability and weatherability than in the case of omitting either one of the urethane resin and the ethylene/vinyl ester resin as shown in Comparative Examples 1 to 4 to be given hereinbelow.

It has also been found that the aforesaid improvements obtained by the cooperative action of the three resins specified in the present invention cannot be achieved by the use of a blend of a vinyl chloride-grafted copolymer of ethylene and vinyl acetate and a thermoplastic urethane resin as shown in Comparative Example 5, or by the use of a well known elastomer for internal plasticization such as chlorinated polyethylene, chlorinated polypropylene, NBR, chlorosulfonated polyethylene or chloroprene in place of the urethane resin mentioned above, as shown in Comparative Examples 6 to 8.

It is an object of this invention therefore to provide a destructible marking film which is free from the disadvantages and defects of conventional destructible marking films and from manufacturing restrictions, and has improved properties such as superior destructibility, thermal stability, surface smoothness, dimensional stability, resistance to heat deterioration after adhesion, and weatherability.

The above and other objects and advantages of the invention will become more apparent from the following description.

The destructible film of this invention has a destructibility of not more than 150 kg.cm/mm, preferably about 2 to about 25 kg.cm/mm, more preferably not more than about 15 kg.cm/mm.

The "destructibility" of a film in the present application is measured substantially in accordance with JIS P8134. This test is an impact perforation strength test for paper board measured by a punching-type impact tester. In the present invention, the testing procedure of JIS P8134 is followed except that the destructible marking film is used instead of the paper board, and the testing device and procedure are somewhat modified as follows:

(1) A 1-inch ball is used as an impact head.

(2) A pendulum is used which can measure the amount of work required for perforation to an extent of 0 to 30 kg.cm.

(3) The sample is cut to a size of 100×100 mm, and mounted on a stand with a diameter of 60 mm.

(4) The perforating position is registered with the center of a circle.

The measured value of the impact perforation strength is expressed in kg.cm/mm.

The destructible marking film of this invention is composed of a blended resin composition containing (A) 100 parts by weight of vinyl chloride resin having a degree of polymerization of about 600 to about 1,600 and optionally containing not more than about 15% by weight of a comonomer unit, (B) about 10 to about 100 parts by weight of a thermoplastic urethane resin, (C) about 2 to about 15 parts by weight of an ethylene/vinyl ester copolymer, and (D) about 10 to about 150 parts by weight of a pigment.

In the destructible film of the invention having a thickness of about 30 microns to about 100 microns composed of the aforesaid resin composition, the amount of the pigment is about 10 to about 150 parts by weight, preferably about 10 to about 100 parts by weight, per 100 parts by weight of the vinyl chloride resin (A). Preferably the destructible marking film of this invention contains up to about 10 parts, for example about 1 to about 10 parts, especially about 1 to about 5 parts, by weight of a lubricant. It may also contain up to about 10 parts by weight of a stabilizer per 100 parts by weight of the vinyl chloride resin. The use of a liquid plasticizer can be omitted in the marking film of this invention, but the inclusion of a small amount of, say, less than about 15 parts by weight, of a liquid plasticizer per 100 parts by weight of the vinyl chloride resin is permissible.

The use of such a small amount of plasticizer in the mixture of the resins (A), (B) and (C) is possible without hampering the achievement of the improvements by the cooperative action of the three resins, and the various defects mentioned above which are caused by the migration of the plasticizer can be fully avoided.

The vinyl chloride resin used for the destructible marking film of this invention is a resin having a degree of polymerization of about 600 to about 1,600. If the degree of polymerization is less than about 600, the dimensional stability of the resulting film is markedly reduced, and after application, the film shrinks and cannot adhere firmly and stably. Moreover, the thermal stability of the film will also be affected. On the other hand, when the degree of polymerization exceeds about 1,600, the productivity of film manufacture is reduced, and it is impossible to produce the film at a commercially feasible speed.

If desired, the vinyl chloride resin (A) may contain not more than 15% by weight of a comonomer unit such as ethylene, propylene, butene, vinyl acetate, an acrylate ester, for example an alkyl acrylate, preferably a $C_1$–$C_{18}$ alkyl ester of acrylic acid, vinylidene chloride, a vinyl ester or a vinyl ether.

The type of the thermoplastic urethane resin (B) to be included in the resin composition in an amount of about 10 to about 100 parts by weight, preferably about 10 to about 50 parts by weight, more preferably about 20 to about 40 parts by weight, per 100 parts by weight of the vinyl chloride resin (A), is properly selected according, for example, to the desired color to be imparted by the pigment (D).

The thermoplastic urethane resin (B) may be those which have little or no tendency to yellowing. Preferably, non-yellowing thermoplastic urethane resins are used.

Preferred species are thermoplastic urethane resins obtained by polyaddition reaction between aliphatic or aromatic diisocyanates and difunctional active hydrogen-containing compounds capable of reacting with the isocyanates.

Examples of the diisocyanates are hexamethylene diisocyanate, hydrogenated diphenylmethane diisocyanate, xylylene diisocyanate, lysine diisocyanate methyl ester, trimethyl hexamethylene diisocyanate, isophorone diisocyanate, hydrogenated tolylene diisocyanate, tolylene diisocyanate, and diphenylmethane diisocyanate.

Examples of suitable difunctional active hydrogen-containing compounds are glycols having a relatively low molecular weight such as ethylene glycol, 1,4-butanediol and propylene glycol, hydroxyl-terminated polyester diols and polyolefin glycols having a relatively high molecular weight, diamines such as ethylenediamine or propylenediamine, and aminoalcohols such as ethanolamine.

Especially preferred thermoplastic urethane resins are those obtained by polyaddition reaction between diisocyanates selected from hexamethylene diisocyanate, hydrogenated diphenylmethane diisocyanate and hydrogenated tolylene diisocyanate and diols selected from polyester diols and polyolefin glycols.

These diisocyanates and difunctional active hydrogen-containing compounds may be used respectively as a mixture of two or more.

Compounds produced by the polycondensation of dibasic acids such as adipic acid or phthalic acid with glycols such as ethylene glycol, 1,4-butanediol or propylene glycol are frequently used as the hydroxyl-terminated polyester diols having a relatively high molecular weight.

When the amount of the thermoplastic urethane resin is smaller than the specified limit, the moldability of the resulting composition is markedly reduced, and the productivity of film formation is extremely reduced. The resulting film will have unsatisfactory destructibility, and its applicability to substrates will be aggravated. On the other hand, when the amount of the urethane resin exceeds the upper limit specified in the present invention, the resulting film has poor surface smoothness and weatherability and non-uniformity in color and luster. Thus, the film will lose its practical applicability.

In the destructible marking film of this invention, about 2 to about 15 parts by weight of the ethylene/vinyl ester copolymer is further included per 100 parts by weight of the vinyl chloride resin (A). The copolymer (C) is, for example, a copolymer of ethylene with a vinyl ester of a $C_2$–$C_{18}$ aliphatic carboxylic acid such as vinyl acetate, vinyl propionate, vinyl butyrate or vinyl stearate.

The ethylene content and the degree of polymerization of the copolymer (C) are not critical in particular. Copolymers (C) having an ethylene content of about 30 to about 70% by weight are preferred. Two or more vinyl esters may be used together. The copolymer (C) may also include a small amount of another copolymerizable monomer such as an acrylate or methacrylate ester. Vinyl acetate is by far the cheapest vinyl ester available.

When the amount of the ethylene/vinyl ester copolymer (C) is smaller than the above-specified limit, the productivity of film formation becomes markedly low, and the resulting film will have poor surface smoothness with color specks. If the amount of the copolymer (C) exceeds the specified upper limit, the film will lose its moderate toughness, or have a rough surface with non-uniformity in color or luster. The resin composition will become strongly tacky, and the productivity of film formation is not industrially satisfactory.

The destructible marking film of this invention also includes the pigment (D). The amount of the pigment is not critical. Especially good results are obtained by using it in an amount of, for example, about 10 to about 150 parts by weight, preferably about 10 to about 100 parts by weight, per 100 parts by weight of the vinyl chloride resin (A).

Examples of the pigment (D) include inorganic pigments such as titanium oxide, zinc oxide, lead white, calcium carbonate, gypsum, precipitated silica, carbon black, red iron oxide, molybdenum red, cadmium yellow, yellow lead, titanium yellow, chromium oxide green and ultramarine; and organic pigments such as Permanent Red 4R, Hansa Yellow 10G, Benzidine Yellow GR, Permanent Carmine FB, Phthalocyanine Blue B, and Phthalocyanine Green.

In addition to the vinyl chloride resin (A), the thermoplastic urethane resin (B), the ethylene/vinyl ester copolymer (C), and the pigment (D), the destructible marking film of the invention may contain about 1 to about 10 parts by weight, preferably about 1 to about 5 parts by weight, of a lubricant per 100 parts by weight of the vinyl chloride resin (A). Almost all lubricants usually employed in the processing of vinyl chloride resins can be used. Examples are polyethylene waxes, liquid paraffin, stearic acid, stearamide, bisamide, n-butyl stearate and aliphatic alcohols.

The use of lubricant serves to impart favorable luster to the destructible marking film of this invention.

The destructible marking film of this invention may contain a small amount of a stabilizer. The amount of the stabilizer is preferably not more than about 10 parts by weight per 100 parts by weight of the vinyl chloride resin. Examples of the stabilizer include calcium stearate, barium stearate, lead stearate, basic lead sulfite, dibasic lead phosphite, dibutyltin dilaurate, dibutyltin dimaleate, dibutyltin mercaptide, dioctyltin maleate-type stabilizers, dioctyltin laurate-type stabilizers, dioctyltin mercapto-type stabilizers, and stannane-diol derivatives or complexes of these. Anti-haze agents such as nonionic surface-active agents, polyoxyethylene, and glycerin monostearate are also cited as such stabilizers.

The film of this invention may also contain an antioxidant such as BHT (2,6-ditertiary-butyl p-cresol) and bisphenol A, and an ultraviolet absorber such as 2,2'-dihydroxy-4-methoxybenzophenone, and 2-(2'- hydroxy-3',5'-ditert.butyl-phenyl)-5-chlorobenzotriazole.

As stated hereinabove, the destructible marking film of the invention may contain not more than about 15 parts by weight of a plasticizer per 100 parts by weight of the vinyl chloride resin (A). When the plasticizer is used in a larger amount, the adhesion stability and operability of the film are deteriorated. When it is used in the amount indicated, favorable results can be obtained in improving the clarity and surface luster of the resulting film. The plasticizer may be selected from those which are commonly used for processing vinyl chloride resins. Preferably, it is selected from epoxy derivatives having an oxirane oxygen content of 2 to 9% and a molecular weight of not more than 1,000, and polyester-type plasticizers of the sebacic acid, adipic acid, azelaic acid, and phthalic acid types.

The destructible marking film of this invention can be prepared by molding the aforesaid pigment-containing resin composition into a film having a thickness of about 30 to about 100 microns.

Preferably, the molding is carried out by a calender method. But when a film having a larger thickness below about 100 microns is to be produced, an extrusion molding method can also be employed.

Film formation by the calender method is well known in the art, and in the present invention, it can be performed in the same manner. Preferably, an as-formed film from a calender film-forming machine is rapidly cooled at its necking portion with a gaseous cooling medium at a temperature of not more than about 30° C., for example, about −10° C. to about 30° C., such as air, nitrogen or carbon dioxide gas.

Since the film of this invention is a destructible marking film, it is necessary to avoid a stretching operation which will result in an ultrathin film having a destructibility (impact strength) of more than 150 kg.cm/mm. Accordingly, the as-formed film from the calender machine has a thickness of about 30 microns to about 100 microns or so. Even when a stretching action is exerted on the film as formed, the extent of stretching of the film should better be such that the percentage of the surface linear speed of a film take-up roll based on the surface linear speed of last roller is not more than about 150%, preferably not more than about 130%. The calender molding temperature is about 140° to about 190° C., and the temperature at the time of stretching is about 50° to about 140° C.

Film formation by an extrusion method can also be performed by procedures well known in the production of unstretched films. Film formation is possible by any of a T-die method and an inflation method. The T-die method is preferred to secure destructibility sufficiently.

The processing temperature is determined properly according to the capability of a given machine while maintaining the temperatures at the cylinder portion, the adapter portion and the die portion respectively at 140° to 220° C.

When it is desired to obtain a substantially unstretched film having a thickness of about 30 to 100 microns, it is necessary to prescribe the die lip clearance at not more than 0.2 mm. Thus, this method is advantageous for producing films having a relatively large thickness of, say, 100 microns.

The present invention is free from the manufacturing restrictions and can afford at a low cost by an easy operation a destructible marking film having improved operability in adhering, thermal stability, surface smoothness, dimensional stability and weatherability. The film can be prepared with good productivity while securing the safety of the working environment and obviating the need to recover the solvent used. According to this invention, the destructibility of the film can be adjusted to the desired value, and has good reproducibility.

The composition of the destructible film obtained as a final product can be determined by the following method.

The film is extracted with ethyl ether. Tetrahydrofuran is added to the residue [containing the resins (A), (B) and (C) and the pigment (D)], and the mixture is stirred. The mixture is filtered to separate it into an insoluble portion and a soluble portion. The soluble portion contains the resins (A), (B) and (C), and the insoluble portion contains only the pigment (D). The weight of the insoluble portion is measured to determine the proportion of the pigment (D).

Tetrahydrofuran is evaporated from the soluble portion. Ethyl acetate is added to the residue, and the mixture is stirred. The mixture is filtered. The filtrate is evaporated to dryness and then weighed. From the IR spectrum of the product, this portion is identified as an ethylene/vinyl acetate copolymer (C).

IR spectrum, characteristic absorptions at 2975 cm$^{-1}$: an absorption band of vinyl acetate, —CH$_3$ stretching 2850 cm$^{-1}$: an absorption band of vinyl acetate and ethylene, —CH$_2$ stretching 1770 cm$^{-1}$: an absorption band of vinyl acetate, C=O stretching 1240 cm$^{-1}$: an absorption band of vinyl acetate, C—O stretching 720 cm$^{-1}$: an absorption band of ethylene, —CH$_2$— skeleton stretching The above ethyl acetate-insoluble portion and a mixture of isopropyl alcohol and toluene (1:1) is stirred. The mixture is filtered, and methanol is added to the filtrate to re-precipitate it. The precipitate is washed with methanol, dried, and weighed. The product is identified as a urethane resin (B) from its IR spectrum.

IR spectrum, characteristic absorptions at 3300 cm$^{-1}$: N-H stretching vibration
2940 cm$^{-1}$: CH$_2$ stretching vibration
1730 cm$^{-1}$: C=O stretching vibration
1550 cm$^{-1}$: a combined absorption band of NH angular displacement, CN stretching The portion insoluble in isopropanol/toluene (1/1) is washed with methanol, dried, and weighed. The product is identified as a vinyl chloride resin (A) from its IR spectrum.

IR spectrum, characteristic absorptions at 2940-2915 cm$^{-1}$: —CH$_2$— stretching vibration
2900-2880 cm$^{-1}$: —CH— stretching vibration
1480-1440 cm$^{-1}$: —CH$_2$ angular displacement vibration
ca. 1340 cm$^{-1}$: —CH— angular displacement vibration
750-650 cm$^{-1}$: C—Cl stretching vibration The following Examples and Comparative Examples illustrate the present invention in more detail.

The various properties in these Examples were measured by the following methods.

Destructibility

Measured at 25° C. by a film impact tester (capacity 30 kg.cm, impact speed 2.2 km/sec., impact ball with a radius of 1 inch) in accordance with the punch-type impact testing method.

Operability in adhering

This is evaluated by the height of the head of a rivet with a diameter of 10 mm to which the film coated with an adhesive can be applied without breakage or raising.
1: a height of more than 4 mm
2: a height of 4 to 3 mm
3: a height of 3 to 2 mm
4: a height of 2 to 1 mm
5: a height of less than 1 mm The larger the height, the better the operability.

Resistance to heat deterioration after adhesion

The film coated with an adhesive is applied to an aluminum plate (an aluminum plate of A5052P stipulated in JIS H4000), and allowed to stand at 25° C. and 70° C. for 168 hours. Then, a peeling test is performed at 25° C. at a peeling angle of 180° and a peeling speed of 200 mm/min. The degree of peeling between the film and the adhesive and the transfer of the adhesive to the aluminum plate is observed.
A: The adhesive was transferred to the aluminum plate; or only the adhesive layer was broken.
C: The adhesive was completely transferred to the aluminum plate A condition between these A and C is expressed as 1/nC according to the extent of transfer.

When the transfer begins, the adhesion strength is not effectively exhibited, and the surface film peels while leaving the adhesive on the adherend. A film whose adhesive layer is transferred with time is difficult to use in applications which will be placed under rigorous temperature conditions, for example in marine containers, signboards, and automobiles however excellent weatherability the surface layer film has.

Thermal stability

The white film stuck to an aluminum plate is allowed to stand in a Geer's oven at 150° C. for 40 minutes. Then, it is taken out of the oven, and its color is evaluated on a scale of 1 to 4 as follows:
1: no change in color
2: changed to light pink
3: changed to light violet
4: changed to violet This change in color is especially important when the film is intended to be applied to parts requiring thermal stability, for example to an engine compartment of an automobile.

Surface smoothness

The surface condition of the film is visually observed, and evaluated on a scale of 1 to 4 as follows:
1: The surface is smooth, and its luster is great.
2: The surface is nearly smooth, but its degree of luster is somewhat low.
3: The surface is somewhat roughened, and the degree of luster is lower.
4: The surface is greatly roughened, and no luster existed.

Productivity

This is evaluated by the maximum speed at which the film can be produced without the occurrence of any defect.

Dimensional stability

The film coated with an adhesive, in a square shape with each side measuring 20 cm, is applied to the same aluminum plate as used in testing resistance to heat deterioration after adhesion. The film is heated at 70° C. for 168 hours. Changes in its lengthwise and crosswise dimensions are measured to evaluate its dimensional stability.

Weatherability

The film coated with an adhesive is applied to an aluminum plate (A-5052P aluminum plate stipulated in JIS H4000), and irradiated for a predetermined period of time by a Sunshine Weather-Ometer (a product of Suga Testing Machine Co., Ltd.; in accordance with JIS K7102; black panel temperature 63±3° C.; spray cycle 18 min./ min.). The time which elapses until the surface of the film is whitened is measured, and defined as the weatherability of the film.

EXAMPLE 1

| Formulation | Parts by weight |
| --- | --- |
| Polyvinyl chloride having a degree of polymerization of 1600 | 100 |
| Urethane resin resulting from a hexamethylene diisocyanate and adipic acid/ethylene glycol ester | 40 |
| Ethylene/vinyl acetate copolymer having an ethylene content of 55% | 8 |
| Titanium oxide | 50 |
| Tin-type stabilizer | 2 |
| Tinuvin P (a product of Ciba-Geigy) | 0.2 |
| Polyethylene wax (lubricant) | 2.0 |

A composition of the above formulation was shaped by a calender method under the following conditions, and cooled with air at 25° C. to form a film having a thickness of 50 microns.

The temperatures of the various rolls in the calender method were as follows:
Mixing roll: 175° C.
Warming roll: 175
Calender rolls
$R_1$: 175
$R_2$: 170
$R_3$: 165
$R_4$: 160

The stretching ratio of the film was 15%.

EXAMPLE 2

| Formulation | Parts by weight |
| --- | --- |
| Polyvinyl chloride having a degree of polymerization of 1100 | 100 |
| Same urethane resin as in Example 1 | 20 |
| Same ethylene/vinyl ester copolymer as in Example 1 | 15 |
| Titanium oxide | 10 |
| Lead-type stabilizer | 3 |
| Stearamide | 1 |
| Epoxidized soybean oil (plasticizer) | 5 |

A composition of the above formulation was formed into a film having a thickness of 70 microns by the same method as in Example 1 except that the temperatures of the calender rolls $R_1$ and $R_3$ were changed to 170 and 160° C. respectively, the stretching ratio was changed to 10%, and the film was cooled with air at 10° C.

EXAMPLE 3

| Formulation | Parts by weight |
| --- | --- |
| Copolymer of vinyl chloride and vinyl acetate having a vinyl acetate content of 10% and a degree of polymerization of 600 | 100 |
| Urethane resin derived from hydrogenated diphenylmethane diisocyanate and adipic acid/propylene glycol | 10 |
| Copolymer of ethylene and vinyl propionate having an ethylene content of 45% | 3 |
| Phthalocyanine Blue | 5 |
| Light calcium carbonate | 10 |
| Barium zinc-type stabilizer | 4 |
| Polyethylene wax | 1 |
| Butylstearate | 2 |

A composition of the above formulation was formed into a film having a thickness of 30 microns in the same way as in Example 2 except that all the rolls were kept at 170° C., and the stretching ratio was changed to 30%.

EXAMPLE 4

| Formulation | Parts by weight |
| --- | --- |
| Polyvinyl chloride having a degree of polymerization of 800 | 100 |
| Urethane resin derived from hexamethylene diisocyanate and polypropylene glycol | 90 |
| Copolymer of ethylene and vinyl acetate having an ethylene content of 65% | 8 |
| Cinquasia Red | 20 |
| Heavy calcium carbonate | 15 |
| Tin-type stabilizer | 2 |
| Calcium zinc type stabilizer | 1 |
| Tinuvin 327 (a product of Ciba-Geigy) | 1 |
| Bisamide | 2 |
| Polyethylene wax | 1 |
| Adipic acid-type polyester (plasticizer) | 3 |

A composition of the above formulation was formed into a film having a thickness of 90 microns by the same method as in Example 1 except that the stretching ratio was changed to 10%, the film was cooled with air at 0° C., and the various rolls were kept at the following temperatures.

Mixing roll: 170° C.
Warming roll: 170
Calender rolls
  $R_1$: 170
  $R_2$: 170
  $R_3$: 175
  $R_4$: 180

EXAMPLE 5

A composition of the same formulation as in Example 1 was shaped by a T-die extrusion method under the following method to form a film having a thickness of 90 microns.

Temperature of the cylinder portion: 170° to 180° C.
Temperature of the adapter portion: 180
Temperature of the die portion: 170
Stretching ratio: 50%
Cooling: with a take-off roll at 30° C.

COMPARATIVE EXAMPLE 1

The procedure of Example 1 was repeated except that the urethane resin was not used. As shown in Table 1, the film obtained had a poor quality.

COMPARATIVE EXAMPLE 2

The procedure of Example 2 was repeated except that the urethane resin was not used.

COMPARATIVE EXAMPLE 3

The procedure of Example 1 was repeated except that the ethylene/vinyl acetate copolymer was not used.

COMPARATIVE EXAMPLE 4

The procedure of Example 4 was repeated except that the ethylene/vinyl acetate copolymer was not used.

COMPARATIVE EXAMPLE 5

The procedure of Example 1 was repeated except that the ethylene/vinyl acetate copolymer was not used, and instead of the polyvinyl chloride, a vinyl chloride-grafted copolymer of ethylene and vinyl acetate obtained by grafting vinyl chloride to an ethylene/vinyl acetate copolymer having an ethylene content of 55% and an intrinsic viscosity of 0.7 in a ratio of 15:1 was used.

COMPARATIVE EXAMPLE 6

The procedure of Example 1 was repeated except that chlorinated polyethylene having a chlorine content of 32% and containing methylene isocyanate (with a specific viscosity of 1.88 at 180° C.) was used instead of the urethane resin.

COMPARATIVE EXAMPLE 7

The procedure of Example 1 was repeated except that NBR having an acrylonitrile content of 30% and a Mooney viscosity of 40 was used instead of the urethane resin.

COMPARATIVE EXAMPLE 8

The procedure of Example 1 was repeated except that chlorosulfonated polyethylene having a Mooney viscosity of 30 was used instead of the urethane resin.

COMPARATIVE EXAMPLE 9

| Formulation | Parts by weight |
|---|---|
| Polyvinyl chloride having a degree of polymerization of 2000 | 100 |
| Polypentyl methacrylate | 10 |
| Polymethyl methacrylate | 5 |
| Titanium oxide | 50 |
| Tin-type stabilizer | 2 |
| Polyethylene wax | 2 |
| Di-(2-ethylhexyl)phthalate (plasticizer) | 15 |

A composition of the above formulation was formed into a film having a thickness of 50 microns by the same calender method as described in Example 1.

COMPARATIVE EXAMPLE 10

The procedure of Comparative Example 9 was repeated except that the film was prepared by a casting method instead of the calender method. In the casting process, a solution of the composition in a solvent consisting of methyl ethyl ketone and toluene in a ratio of 80:20 was cast on a stainless steel belt having a length of 80 meters, and dried in an atmosphere held at 80° to 160° C. The stretching ratio was 5%, and the film was cooled at 15° C.

COMPARATIVE EXAMPLE 11

A composition having the same formulation as in Example 1 was cast into a film having a thickness of 50 microns by the same method as in Comparative Example 10 except that tetrahydrofuran was used instead of the methyl ethyl ketone/toluene mixture.

COMPARATIVE EXAMPLE 12

The procedure of Example 1 was repeated except that the amount of the ethylene/vinyl acetate copolymer was changed to 20 parts by weight.

COMPARATIVE EXAMPLE 13

The procedure of Example 1 was repeated except that polyvinyl chloride having a degree of polymerization of 400 was used instead of the polyvinyl chloride used in Example 1.

COMPARATIVE EXAMPLE 14

The procedure of Example 1 was repeated except that polyvinyl chloride having a degree of polymerization of 1100 was used instead of the polyvinyl chloride used in Example 1, and the amount of the urethane resin was changed to 120 parts by weight.

The various properties of the films obtained in the above Examples and Comparative Examples were measured, and the results are shown in Table 1.

Table 1

| Example (Ex.) or Comparative Example (CEx.) | Destructibility (kg-cm/mm) | Operability in adhesion | Resistance to deterioration after adhesion | Thermal stability | Surface smoothness | Productivity (m/min.) | Dimensional stability (%) | Weatherability (hours) |
|---|---|---|---|---|---|---|---|---|
| Ex. 1 | 20 | 1 | A | 1 | 1 | 40 | 0.05 | above 3000 |
| Ex. 2 | 33 | 1 | A | 1 | 1 | 30 | 0.08 | 1800–2000 |
| Ex. 3 | 18 | 1 | A | 1 | 1 | 30 | 0.10 | 2300–2500 |
| Ex. 4 | 37 | 1 | A | 1 | 1 | 35 | 0.15 | above 3000 |
| Ex. 5 | 45 | 1 | A | 1 | 1 | 30 | 0.30 | above 3000 |
| CEx. 1 | — | — | — | — | — | — | — | — |
| CEx. 2 | 111 | 5 | 3/4C | 3 | 4 | 8 | 3.04 | 400–600 |
| CEx. 3 | 83 | 2 | 1/2C | 3 | 3 | 15 | 1.40 | 1000–1200 |
| CEx. 4 | 250 | 2 | C | 4 | 4 | 7 | 2.35 | 1000–1200 |
| CEx. 5 | 330 | 4 | 1/6C | 3 | 4 | 4 | 2.28 | 600–800 |
| CEx. 6 | 181 | 3 | 1/4C | 3 | 4 | 8 | 2.37 | 500–700 |
| CEx. 7 | 126 | 3 | 3/4C | 3 | 4 | 5 | 1.26 | 400–600 |
| CEx. 8 | 166 | 3 | 4/5C | 3 | 4 | 4 | 4.18 | 400–600 |
| CEx. 9 | 9 | 2 | C | 1 | 1 | 30 | 1.33 | 1000–1200 |
| CEx. 10 | 95 | 1 | 4/5C | 1 | 3 | 20 | 0.90 | 1000–1200 |
| CEx. 11 | 154 | 2 | A | 1 | 3 | 15 | 0.81 | 1000–1200 |
| CEx. 12 | 160 | 1 | 1/6C | 1 | 3 | 30 | 0.75 | 1000–1200 |
| CEx. 13 | 34 | 1 | A | 3 | 3 | 35 | 0.95 | 800–1000 |
| CEx. 14 | 320 | 2 | A | 4 | 3 | 9 | 1.72 | 800–1000 |

What I claim is:

1. A destructible marking film having a thickness of about 30 to about 100 microns and a destructibility of not more than 150 kg·cm/mm, said film being composed of a resin composition comprising
   (A) 100 parts by weight of a vinyl chloride resin having a degree of polymerization of about 600 to about 1,600 and optionally containing not more than about 15% by weight of a comonomer unit,
   (B) about 10 to about 100 parts by weight of a thermoplastic urethane resin,
   (C) about 2 to about 15 parts by weight of (1) a copolymer consisting of units of (a) ethylene and (b) a vinyl ester of a $C_2$–$C_{18}$ aliphatic carboxylic acid, or (2) a copolymer consisting of units of (a) ethylene, (b) a vinyl ester of a $C_2$–$C_{18}$ aliphatic carboxylic acid and (c) an acrylate or methacrylate ester, and
   (D) about 10 to about 150 parts by weight of a pigment.

2. The film of claim 1 wherein the resin composition contains at least one additive selected from the group consisting of up to about 10 parts by weight of a lubricant, up to about 10 parts by weight of a stabilizer, and up to about 15 parts by weight of a liquid plasticizer.

3. The film of claim 1 wherein the comonomer unit of the resin (A) is selected from ethylene, propylene, butene, vinyl acetate, alkyl acrylates, vinylidene chloride, vinyl esters and vinyl ethers.

4. The film of claim 1 wherein the thermoplastic urethane resin (B) is a thermoplastic urethane resin derived from an aliphatic or aromatic diisocyanate and a difunctional active hydrogen-containing compound capable of reacting with the diisocyanate.

5. The film of claim 1 wherein the copolymer (C) is a copolymer of ethylene and a vinyl ester of an aliphatic carboxylic acid containing 2 to 18 carbon atoms.

6. The film of claim 1 wherein the copolymer (C) has an ethylene content of about 30 to about 70% by weight.

7. The film of claim 1 wherein the vinyl ester in the copolymer (C) is at least one member selected from the group consisting of vinyl acetate, vinyl propionate, vinyl butyrate, vinyl stearate, and mixtures of at least one of the foregoing vinyl esters with an acrylate or methacrylate ester.

8. A process for preparing a destructible marking film having a thickness of about 30 to about 100 microns and a destructibility of not more than 150 kg·cm/mm, which comprises molding a resin composition by calendering or melt-extrusion, said composition consisting essentially of
(A) 100 parts by weight of a vinyl chloride resin having a degree of polymerization of about 600 to about 1,600 and optionally containing not more than 15% by weight of a comonomer unit,
(B) about 10 to about 100 parts by weight of a thermoplastic urethane resin,
(C) about 2 to about 15 parts by weight of (1) a copolymer consisting of units of (a) ethylene and (b) a vinyl ester of a $C_2$-$C_{18}$ aliphatic carboxylic acid, or (2) a copolymer consisting of units of (a) ethylene, (b) a vinyl ester of a $C_2$-$C_{18}$ aliphatic carboxylic acid and (c) an acrylate or methacrylate ester, and
(D) about 10 to about 150 parts by weight of a pigment.

9. A method for marking, which comprises applying to the surface of a substrate a destructible film having a thickness of about 30 to about 100 microns and a destructibility of not more than 150 kg·cm/mm, said film being composed of a resin composition comprising
(A) 100 parts by weight of a vinyl chloride resin having a degree of polymerization of about 600 to about 1,600 and optionally containing not more than 15% by weight of a comonomer unit,
(B) about 10 to about 100 parts by weight of a thermoplastic urethane resin,
(C) about 2 to about 15 parts by weight of (1) a copolymer consisting of units of (a) ethylene and (b) a vinyl ester of a $C_2$-$C_{18}$ aliphatic carboxylic acid, or (2) a copolymer consisting of units of (a) ethylene, (b) a vinyl ester of a $C_2$-$C_{18}$ aliphatic carboxylic acid and (c) an acrylate or methacrylate ester, and
(D) about 10 to about 150 parts by weight of a pigment.

* * * * *